United States Patent

Calligaris et al.

[15] 3,650,747

[45] Mar. 21, 1972

[54] ELECTROLESS DEPOSITION OF NICKEL, COBALT, COPPER OR IRON METAL AND A BISMUTH, ANTIMONY, LEAD, TIN, TITANIUM, TUNGSTEN OR CHROMIUM SALT ON A GOLD, PLATINUM OR PALLADIUM LATENT IMAGE

[72] Inventors: Ennio Calligaris; Roy Callaby; Mario Rossello, all of Savona, Italy

[73] Assignee: Minnesota Mining and Manufacturing Company

[22] Filed: Jan. 31, 1969

[21] Appl. No.: 795,708

[52] U.S. Cl. ....................96/48

[51] Int. Cl. ....................G03c 5/24

[58] Field of Search ....................96/48

[56] References Cited

UNITED STATES PATENTS

| | | | |
|---|---|---|---|
| 2,267,953 | 4/1940 | Schumpelt | 96/48 PD |
| 3,223,525 | 12/1965 | Jonker et al. | 96/48 PD |

*Primary Examiner*—Norman G. Torchin
*Assistant Examiner*—Won H. Louie, Jr.
*Attorney*—Kinney, Alexander, Sell, Steldt & De La Hunt

[57] ABSTRACT

Salts of bismuth, antimony, lead, tin, gold, silver, titanium, tungsten and chromium are employed to impart continuous tone characteristics to image reproductions produced by the electroless deposition of a non-noble metal onto a recording medium.

5 Claims, No Drawings

ELECTROLESS DEPOSITION OF NICKEL, COBALT, COPPER OR IRON METAL AND A BISMUTH, ANTIMONY, LEAD, TIN, TITANIUM, TUNGSTEN OR CHROMIUM SALT ON A GOLD, PLATINUM OR PALLADIUM LATENT IMAGE

This invention relates to a process for continuous-tone image recording and to photosensitive media and electroless deposition solutions for use therein.

In addition to the conventional photographic techniques, many other processes for converting a light image into a visible print have been described in the literature. One approach utilized the ability of light to reduce ferric salts to ferrous salts, the ferrous ion then serving as a reducing agent for the reduction of noble metal ions to free noble metal. Among the several processes of this type are the platinotype, palladiotype, iron-gold system, iron-mercury system and iron-silver (i.e., "-brownprint") systems, in which visible images are obtained by the reduction to free metal of platinum, palladium, gold, mercury and silver ions. For the most part these processes have not found any practical application, principally because of the large quantities of expensive noble metals required.

In U.S. Pat. No. 3,223,525 a non-conductive support is treated with a light sensitive compound, such as silver halide, or a compound which produces upon exposure to light a reaction product capable of producing, by reduction in the presence of water, either silver or mercury atoms from water soluble silver or mercury salts. The treated support is then exposed to light to form a "germ image" or latent image and developed with a stabilized physical developer for a prolonged period of time to form a visible image of a noble metal, such as silver. This process is cumbersome and time consuming. In the process described in Belgian Pat. No. 637,058, the latent image of silver or mercury produced by light exposure is "activated" by treating the latent image areas with a solution of a salt of the platinum group, such as palladium chloride, to provide in the image areas catalytic metal for the chemical or electroless deposition of a metal, such as nickel or cobalt. The procedures for electroless deposition of such metals onto catalytic sites are well known. Although this process affords a technique for preparing visible prints of a light image, it is quite complex and slow and requires the use of silver or mercury salts.

A recently developed process obviates the necessity of using silver salts and large quantities of precious metals and does not require an intermediate activating treatment with a catalyst solution. The photographic element has a photosensitive layer comprising a composition capable upon light exposure of directly generating nuclei of a metal more noble than silver. The nuclei are capable of catalyzing the electroless deposition thereon of a non-noble metal. This process comprises exposing the photographic element to a light image to generate non-noble metal nuclei in imaged areas of the element, and then providing non-noble free metal selectively on the nuclei by electroless deposition to form a visible image. Although this photographic element and process are desirable and entirely satisfactory in many respects, the image reproductions available therefrom generally are characterized by unusually high contrast. The photographic element and process are primarily useful in reproducing line and halftone images. Because of the advantages otherwise gained through the use of this photographic element and process, means for rendering the process and element useful for continuous tone image reproduction are highly desirable.

It is hence an object of the present invention to provide a recording medium which employs the electroless deposition of a non-noble metal and which is capable of providing a continuous tone image reproduction.

Another object is to provide an imaging process which employs the electroless deposition of a non-noble metal and which provides continuous tone image reproductions.

Briefly, the imaging process of the present invention relates to an improvement over the imaging process which comprises:

a. exposing to a light image a photosensitive medium having a photosensitive layer comprising a composition which upon light exposure is capable of directly generating nuclei of a metal which is more noble than silver and is catalytic to the electroless deposition of a non-noble metal, and b. providing non-noble free metal selectively on said nuclei by electroless deposition to provide a visible print of said light image. The improvement comprises providing the non-noble metal selectively on the nuclei in the presence of at least one salt of bismuth, antimony, lead tin titanium, tungsten or chromium. In some instances it is desirable to incorporate such metal salts into both the photosensitive layer and in the electroless deposition solution.

The development of the latent image formed by the free catalytic metal utilizes well known electroless deposition procedures, as illustrated by U.S. Pat. Nos. 2,532,282; 2,690,401; 2,690,402; 2,726,969; 2,762,723; 2,871,142; and 3,011,920. Electroless deposition of metals involves the reduction of the metal ion and the simultaneous oxidation of a reducing agent on catalytic surfaces, resulting in the deposition of free metal atoms on the catalytic surfaces. The deposition baths generally comprise salts of the metal to be deposited (e.g., $NiCl_2 \cdot 6H_2O$; $CuSO_4 \cdot 5H_2O$, etc.), reducing agents (e.g., sodium hypophosphite, formaldehyde, hydrazine), complexing agents to prevent fog and buffering agents (e.g., tartrates, citrates, oxalates, etc.). The catalytic metals are preferably selected from the noble metals, particularly the metals more noble than silver, such as platinum, palladium, gold, etc. Palladium is the most preferred catalytic metal. Although many non-noble metals can be electrolessly deposited, including nickle, cobalt, copper, iron, chromium, etc., the use of nickel, cobalt or a mixture thereof has produced outstanding images which have excellent black rendition and which are very stable.

In the practice of this process the catalytic metal is preferably palladium, and the non-noble metal forming the visible image is preferably copper, nickel, cobalt or a mixture thereof. In one preferred embodiment the composition which generates nuclei of the catalytic metal directly upon light exposure comprises a slat of the catalytic metal and a light sensitive compound which generates, upon light exposure, a reducing agent for said catalytic metal salt. For example, when the catalytic metal salt is a palladium salt, a ferric salt which can generate ferrous ion upon light exposure in the presence of moisture may be used. Organic ferric salts, such as ferric ammonium oxalate, ferric potassium oxalate, ferric ammonium citrate and ferric ammonium tartrate are reducible to form ferrous ions upon light exposure. Inorganic ferric salts may be used together with a reducing agent to form ferrous ions upon light exposure, and a preferred oxidation-reduction system is ferric chloride-oxalic acid. The ferrous ion generated by the exposure serves to reduce the catalytic metal ion or radical (e.g., $Pd^{+2}$) to free catalytic metal nuclei (e.g., $Pd^0$). In another preferred embodiment the composition which generates nuclei of the catalytic metal directly upon light exposure comprises a photoreducible salt of the catalytic metal, as exemplified by palladium ammonium oxalate. Both of these embodiments produce catalytic metal nuclei in the photosensitive layer directly upon light exposure, although the application of heat may be used to accelerate the rate of reaction and improve the yield of catalytic metal nuclei in the image areas. The photosensitive layer preferably also contains hydrophilic polymers, such as polyether glycols (e.g., polyethylene glycols), polyvinyl alcohol, carboxy-methylcellulose, gelatin or aqueous emulsions of various polymers. Minor amounts of a surfactant have also been found to offer beneficial effects.

When the recording media as described above is exposed to a light source, particularly a light source having a high ultraviolet light output, a very faint or invisible latent image is formed by the nuclei of catalytic free noble metal in the exposed areas. A slight amount of moisture is desired in the photosensitive layer, although the layer may be dried to all appearance and touch. The exposed media is then immersed in the electroless deposition bath of the invention until a visible image of the desired density is produced. A subsequent water wash is desirable to remove excess developer, and the media is then allowed to dry. Prints produced in this manner exhibit excellent continuous tone images and outstanding stability to aging. The image areas appear to adhere very well to the support.

At least one salt (preferably water soluble) of bismuth, antimony, lead, tin, titanium, tungsten or chromium is incorporated into the electroless plating solution to yield excellent results. Examples of such salts include bismuth chloride, antimony chloride, lead acetate, titanium chloride, tin tetrachloride, sodium tungstate, chromium chloride, and chromium fluoride.

The recording media of the present invention comprises a photosensitive layer as described above on a suitable support including various types of paper and transparent supports such as saponified diacetate and triacetate, as well as cellophane, polystyrene, polyesters, and any other suitable adequately subbed support or film base of the kind useful in the photographic field.

It is surprising that the metal salts of the present invention are capable of providing continuous tone reproductions. By means of the present invention, one may obtain continuous tone prints from easily prepared and inexpensive recording media. The unexposed recording media of the present invention exhibit excellent storage stability.

The following examples are provided for illustrative purposes only and should not be construed as limiting the scope of the present invention

EXAMPLE 1

A solution of

| | |
|---|---|
| ferric ammonium oxalate | 2.0 g. |
| palladium chloride (stabilized with ethylenediamine tetraacetic acid) | 25 ml. |
| polyethylene glycol 6,000 (a poly ethylene glycol of 6,000 average molecular weight; a product of Kessler Chemical Co.) | 4.0 g. |
| Tinegal NA (hydroxylated fatty alcohol, a trademarked product of J. R. Gicgy Co.) | 2.0 ml. |
| water | 25 ml. |

was coated onto a paper substrate and dried. The coated paper was then exposed through a transparent original to U.V. light and was processed in an electroless deposition solution having the following composition:

| | |
|---|---|
| nickel chloride hexahydrate | 40 g. |
| bismuth chloride (10% solution, prepared as set forth below) | 3.2 ml. |
| sodium potassium tartrate | 200 g. |
| glycine | 23 g. |
| ammonium chloride | 50 g. |
| sodium hypophosphite | 20 g. |
| water | 1,000 ml. |
| sodium hydroxide, concentrated | to pH 9 |

The bismuth chloride solution was prepared by sequentially combining 10 g. bismuth chloride, 30 ml. 20 percent hydrochloric acid, 20 g. tartaric acid, sufficient 32 percent ammonium hydroxide to make the solution alkaline, and sufficient water to make 100 ml. of solution.

After processing in this solution, a continuous tone, stable print was obtained.

EXAMPLES 2-5

The procedure of Example 1 was repeated except that the bismuth chloride solution of the electroless deposition solution was replaced with one of the following materials:

| Example | Material |
|---|---|
| 2 | 1.5 ml. 10% $SbCl_3$, prepared as explained below |
| 3 | 3.8 ml. 10% aqueous $Pb(CH_3COO)_2$ solution |
| 4 | 5.0 ml. 1% aqueous $TiCl_3$ solution |
| 5 | 5 g. $SnCl_3$ |

The temperature of the electroless deposition solutions of Examples 2-5 was maintained at 75°-80° C. Results similar to those of Example 1 were obtained.

The 10% $SbCl_3$ solution of Example 2 was prepared by sequentially combining 10 g. $SbCl_3$, 30 ml. 20% hydrochloric acid, 20 g. tartaric acid, sufficient 32 percent ammonium hydroxide to make the solution alkaline, and sufficient water to bring the volume of the solution to 100 ml.

Example 6

The process of Example 1 was repeated, except that an electroless deposition solution of the following composition was employed:

| | |
|---|---|
| nickel chloride | 40 g. |
| cobalt chloride | 20 g. |
| antimony chloride, 10% solution (prepared as in Example 2) | 1.5 ml. |
| sodium potassium tartrate | 200 g. |
| ammonium chloride | 50 g. |
| glycine | 23 g. |
| sodium hypophosphite | 20 g. |
| water | 1,000 ml. |
| sodium hydroxide, concentrated | to pH 9 |

Continuous tone, stable prints were obtained.

EXAMPLE 7-10

Example 6 was repeated, except that one of the following materials was substituted for the 10% antimony chloride solution to yield similar results.

| Example | Material |
|---|---|
| 7 | 3.2 ml. 10% aqueous $BiCl_3$ (prepared as in Example 1) |
| 8 | 3.8 ml. 10% $Pb(CH_3COO)_2$ solution |
| 9 | 5.0 ml. 1.0% aqueous $TiCl_3$ solution |
| 10 | 5.0 g. $SnCl_3$ |

The materials of Examples 2-5 or 7-10 may be combined in a single electroless deposition solution, if desired, to yield comparable continuous-tone reproductions.

EXAMPLE 11

The procedure of Example 1 was repeated except that an electroless deposition solution of the following composition was employed at a temperature of 75°-80° C:

| | |
|---|---|
| nickel chloride heptahydrate | 30 g. |
| sodium tungstate dihydrate | 30 g. |
| glycine | 23 g. |
| sodium potassium tartrate tetrahydrate | 200 g. |
| ammonium chloride | 50 g. |
| sodium hypophosphite monohydrate | 20 g. |
| water | 1,000 ml. |
| sodium hydroxide, concentrated | to pH 9 |

A stable, continuous-tone print was obtained.

EXAMPLE 12

The procedure of Example 1 was repeated, except that an electroless deposition solution of the following composition and pH of 5.0-5.5 was employed at 30° C:

| | |
|---|---|
| nickel chloride heptahydrate | 4 g. |
| chromium fluoride | 15 g. |
| chromium chloride | 1.0 g. |
| glycine | 30 g. |
| sodium succinate | 32 g. |
| sodium citrate | 7.2 g. |
| sodium hypophosphate | 40 g. |
| water | 1,000 ml. |

Stable, continuous-tone reproductions were obtained.

EXAMPLE 13

A solution of

| | |
|---|---|
| ferric ammonium oxalate trihydrate | 2.0 g. |
| auric chloride, 2% aqueous solution | 25 ml. |
| palladium chloride, 0.2% aqueous solution (stabilized with ethylene diamine tetraacetic acid disodium salt | 25 ml. |
| polyethylene glycol 6,000 (a product of Kessler Chemical Co.) | 4 g. |
| Tinegal NA (a trademarked product of J. R. Giegy Co.) | 2.0 ml. |

was coated on a paper substrate, dried, exposed to a U.V. light source through a transparent original and developed in an electroless deposition solution of the following composition:

| | |
|---|---|
| nickel sulfate heptahydrate | 30 g. |
| sodium tungstate dihydrate | 30 g. |
| glycine | 23 g. |
| sodium potassium tartrate tetrahydrate | 200 g. |
| ammonium chloride | 50 g. |
| sodium hypophosphate monohydrate | 20 g. |
| water | 1,000 ml. |
| sodium hydroxide, concentrated | to pH 9 |

Bath temperature was maintained at 75°–80° C. A continuous-tone, stable print was obtained.

EXAMPLE 14

The procedure of Example 1 was repeated exactly except that the photographic substrate which was employed was a sheet of cellulose triacetate bearing a layer of hardened gelatin. A continuous tone, stable reproduction was obtained having a maximum density of about 4.

EXAMPLE 15

A solution of

| | |
|---|---|
| ferric ammonium oxalate trihydrate | 4 g. |
| auric chloride, 0.2% aqueous solution | 25 ml. |
| ammonium chloropalladate, 0.32% aqueous solution | 25 ml. |
| polyethylene glycol 6,000 (Kessler Chemical Co.) | 4 g. |
| Tinegal NA (a trademarked product of J. R. Giegy Co.) | 2 ml. |

was coated on a paper support, dried, exposed to U. V. light through a transparent original, and developed in the electroless deposition solution of Example 1 to yield a stable, continuous-tone reproduction.

EXAMPLE 16

A solution of

| | |
|---|---|
| ferric ammonium oxalate trihydrate | 2 g. |
| auric chloride, 0.1% aqueous solution | 25 ml. |
| palladium chloride 0.2% aqueous solution | 25 ml. |
| polyethylene glycol 6,000 (Kessler Chemical Co.) | 4 g. |
| Alipal CO 433, 2% aqueous solution sodium salt of the sulfate ester of an alkylphenoxy-poly(ethyleneoxy) ethanol, a trademarked product of General Aniline and Film Corporation) | 2 ml. |

was coated onto a surface-saponified cellulose acetate, dried, exposed to U. V. light through a transparent original, and processed in the electroless deposition solution of Example 1. A stable, continuous-tone reproduction was obtained.

Similar results are obtainable by substituting ammonium chloropalladate (0.32 percent aqueous solution) for the palladium chloride of the present example.

EXAMPLE 17

A solution of

| | |
|---|---|
| ferric ammonium oxalate trihydrate | 2 g. |
| palladium chloride, 0.2% aqueous solution | 25 ml. |
| polyethylene glycol 6000 Kessler Chemical Co.) | 4 g. |
| Alipal Co 433 (a trademarked product of General Aniline and Film Corporation) | 2 ml. |

was coated on a paper support and dried. Over this coating was then coated a solution of:

| | |
|---|---|
| silver nitrate, 0.1% aqueous solution | 25 ml. |
| Alipal CO 433 (a trademarked product of General Aniline and Film Corporation) | 1 ml. |

After drying, the coated paper was exposed to U. V. light through a transparent original and was processed in the electroless deposition solution of Example 1. A stable, continuous-tone reproduction was obtained.

What is claimed is:

1. In the imaging process which comprises
a. exposing to a light image a photosensitive medium having a photosensitive layer comprising a composition which upon light exposure is capable of directly generating nuclei of a metal which is more noble than silver and is catalytic to the electroless deposition of a non-noble metal, and
b. providing non-noble free metal from solution selectively on said nuclei by electroless deposition to provide a visible print of said light image;
the improvement which comprises incorporating into said solution prior to said electroless deposition at least one salt of bismuth, antimony, lead, tin, titanium, tungsten or chromium.

2. In the imaging process which comprises
a. exposing to a light image a photosensitive medium having a photosensitive layer which includes a palladium salt, which layer is capable upon light exposure of directly generating palladium nuclei which are catalytic to the electroless deposition thereon of a non-noble metal, and
b. providing non-noble free metal from solution selectively on said nuclei by electroless deposition to provide a visible print of said light image;
the improvement which comprises incorporating into said solution prior to said electroless deposition at least one salt of bismuth, antimony, lead, tin, titanium, tungsten or chromium.

3. Imaging process which comprises
a. exposing to a light image a photosensitive medium having a photosensitive layer which includes a palladium salt, which layer is capable upon light exposure of directly generating palladium nuclei which are catalytic to the electroless deposition thereon of a non-noble metal and
b. providing non-noble free metal selected from the group consisting of copper, nickel and cobalt selectively on said nuclei by electroless deposition from solution to provide a visible print of said light image;
the improvement which comprises incorporating into said solution prior to said electroless deposition at least one salt of bismuth, antimony, lead, tin, titanium, tungsten or chromium.

4. The process of claim 3 wherein said photosensitive layer includes a photosensitive ferric salt.

5. Imaging process which comprises
a. exposing to a light image a photosensitive medium having a photosensitive layer which includes a palladium salt and a light-sensitive ferric salt, said composition being capable upon light exposure of directly generating palladium nuclei which are catalytic to the electroless deposition thereon of a non-noble metal, and
b. providing copper, nickel or cobalt from solutions selectively on said nuclei by electroless deposition to provide a visible print of said light image;
the improvement which comprises incorporating into said solution prior to said electroless deposition at least one salt of bismuth, antimony, lead, tin, titanium, tungsten or chromium.

* * * * *